UNITED STATES PATENT OFFICE.

LOUIS C. JONES, FRED L. GROVER, AND JOSEPH L. SILSBEE, OF SYRACUSE, NEW YORK, ASSIGNORS TO THE SOLVAY PROCESS COMPANY, OF SOLVAY, NEW YORK, A CORPORATION OF NEW YORK.

PROCESS OF RECOVERING POTASSIUM AND MAGNESIUM CHLORIDS FROM NATURAL DEPOSITS.

1,215,546. Specification of Letters Patent. Patented Feb. 13, 1917.

No Drawing. Application filed October 23, 1916. Serial No. 127,065.

*To all whom it may concern:*

Be it known that we, LOUIS C. JONES, FRED L. GROVER, and JOSEPH L. SILSBEE, citizens of the United States, residing at Syracuse, in the county of Onondaga and State of New York, have invented a new and Improved Process of Recovering Potassium and Magnesium Chlorids from Natural Deposits, of which the following is a specification.

Our invention relates particularly to the treatment of certain natural deposits either brines or residues left by the evaporation of brines which collect in inland basins in the Western States and which contain potassium, sodium, and magnesium chlorids in varying proportions and degrees of concentration, a small proportion of sulfate, probably as gypsum, frequently also being present. As a rule sodium chlorid is present in such brines in large excess, though our process is equally applicable to the treatment of those brines in which sodium chlorid is found in about the same degree of concentration as the potassium and magnesium chlorids.

For the sake of clearness we will describe our process, by way of illustration, as applied to the treatment of a brine of specific concentration, viz:

Sodium chlorid 290 grams per liter,
Potassium chlorid 22 grams per liter,
Magnesium chlorid 18 grams per liter.

In the treatment of the solution we first run the brine into shallow ponds or vats and evaporate it by solar heat until the large excess of sodium chlorid is precipitated and the residual brine is almost saturated with potassium chlorid at the temperature of evaporation, usually about 30° C.

A solution is fully saturated with potassium chlorid at 30° C. when it has the composition Sodium chlorid 160 grams per liter,
Potassium chlorid 130 grams per liter,
Magnesium chlorid 90 grams per liter.

In order, however, to avoid possible loss of potassium chlorid through sudden cooling through climatic changes, we do not carry the solar evaporation to the point of complete saturation in potassium chlorid but prefer to stop the same when the potassium chlorid content of the solution is approximately 110 grams per liter. The solution is then drawn off leaving the precipitated sodium chlorid which can be harvested, washed and marketed if desired.

The solution resulting from the preceding step of the process is then concentrated at a high temperature, either in direct fired pans or mutiple effect evaporators, the latter being preferable for reasons of economy.

The concentration of the solution is carried to the point where it is approximately saturated with potassium chlorid, the temperature being always maintained at a point where actual saturation in and precipitation of potassium chlorid will not occur. When the solution becomes saturated with potassium chlorid at the highest temperature attainable (110° C. to 115° C.) the concentration is stopped and the solution removed from the evaporator. We have found by experiment that the solution is saturated with sodium and potassium chlorid at approximately 100° C. when it contains Sodium chlorid 90 grams per liter,
Potassium chlorid 230 grams per liter,
Magnesium chlorid 160 grams per liter, and we endeavor to approximate this composition of the solution as nearly as possible, without the precipitation of any potassium chlorid.

During the evaporation just described sodium chlorid is precipitated and continually removed.

The nearly saturated liquor produced in the preceding step of the process, is then cooled to effect the separation of pure potassium chlorid. The lower the temperature to which the liquor is cooled the greater will be the yield of potassium chlorid; but for economical reasons a temperature below 25° C. is not practical. By cooling to 25° C. we find that about 60 per cent. of the total potassium chlorid content of the liquor is precipitated. The precipitate analyzes, after slight washing, 95 per cent. KCl. Since the solubility of sodium chlorid increases in this solution with decrease of temperature no sodium chlorid is precipitated with the potassium chlorid.

The mother liquor from the crop of potassium chlorid of the preceding step contains about 90 grams per liter of potassium chlorid, or 40 per cent. of the total potassium chlorid.

To a further recovery of the potassium chlorid the solution is again evaporated by artificial heat at a high temperature. The evaporation is, however, stopped much sooner than in the former heating since the solution becomes saturated with potassium chlorid at a lower concentration due to the increase in the amount of magnesium chlorid. We have found it satisfying to stop this evaporation when the concentration of potassium chlorid has reached 145 grams per liter. During this evaporation sodium chlorid only will be thrown down and removed.

The hot saturated solution containing 145 grams per liter potassium chlorid is now cooled to as near 25° C. as is feasible, and pure potassium chlorid is precipitated. This cold crop comprises about 25 per cent. of the total potassium chlorid making the recovery to this point 85 per cent. of the whole.

The mother liquor separated from this second cold crop of potassium chlorid contains all the magnesium chlorid originally present in the brine. This oily liquor holds about 300 grams per liter magnesium chlorid.

To separately recover the magnesium chlorid this liquor is evaporated by artificial heat at a high temperature until it contains about 460 grams per liter magnesium chlorid. During this evaporation the remaining 15 per cent. of the potassium chlorid is precipitated as the double salt, carnallite ($KClMgCl_2 6H_2O$) which is removed. The liquor, freed from the carnallite, is further evaporated, preferably by direct heat in iron pots, until it contains 48 per cent. $MgCl_2$, the remaining 52 per cent. being water. This mixture solidifies on cooling.

In order to complete the recovery of the potassium chlorid the carnallite precipitated in the preceding step of the process is decomposed by treating it with the mother liquor from the first cold crop of potassium chlorid, or other liquor saturated with potassium chlorid but not with magnesium chlorid. This liquor being unsaturated with regard to magnesium chlorid, dissolves that constituent of the carnallite and, being saturated with potassium chlorid leaves that constituent undissolved. In this way the last 15 per cent. of the potassium chlorid is recovered. Instead of dissolving out the magnesium chlorid from the carnallite, we may treat the carnallite to completely dissolve it in a suitable liquor as in the mother liquor from the first crop of potassium chlorid when heated, this being sufficiently unsaturated to dissolve both salts. In this case the potassium chlorid from the carnallite will appear in the second cold crop of potassium chlorid.

While we have described our process as applied to a brine of specific composition and concentration, it will be understood that it is equally applicable to all such brines. Thus if the natural brine is already nearly saturated with respect to potassium chlorid, the initial solar evaporation to remove the large excess of sodium chlorid may be omitted or abbreviated. Or if the concentration of magnesium chlorid is much larger than that of potassium chlorid, the evaporation at a high temperature cannot be carried so far as indicated above before saturation with potassium chlorid takes place, and a larger percentage of the potassium chlorid will be precipitated as carnallite.

In any case the small amount of gypsum, if any, present may be disregarded, this being precipitated throughout the several steps of the process as a slight impurity.

Having thus described our invention, what we claim as new and desire to secure by Letters Patent is:

1. The process of treating brines containing chlorids of sodium, potassium and magnesium which consists in evaporating the brine at a relatively low temperature until it is nearly saturated with respect to potassium chlorid and freeing the concentrated solution from the precipitated sodium chlorid, evaporating the liquor at high temperature with removal of the precipitated sodium chlorid until it is saturated with potassium chlorid but not with magnesium chlorid at that temperature and finally cooling the solution to precipitate potassium chlorid while leaving the magnesium chlorid in solution.

2. The process of treating brines containing chlorids of sodium, potassium, and magnesium which consists in evaporating the brine at a relatively low temperature until it is nearly saturated with respect to potassium chlorid and freeing the concentrated solution from the precipitated sodium chlorid, evaporating this liquor at a high temperature with removal of the precipitated sodium chlorid until it is saturated with potassium chlorid but not with magnesium chlorid at that temperature, cooling to precipitate potassium chlorid and removing the precipitate, again saturating the solution by evaporation at a high temperature with potassium chlorid only and removing the hot crop of sodium chlorid and again cooling to precipitate a second crop of potassium chlorid while leaving the magnesium chlorid in solution.

3. The process of treating brines containing chlorids of sodium, potassium and magnesium which consists in evaporating the brine at a relatively low temperature until it is nearly saturated with respect to potassium chlorid and freeing the concentrated solution from the precipitated sodium chlorid, evaporating this liquor at a high temperature with removal of the precipitated sodium chlorid, until it is saturated with potassium chlorid but not with magnesium chlorid at that temperature, cooling to precipitate potassium chlorid and removing the precipitate, again saturating the solution by evaporation at a high temperature with potassium chlorid only and removing the hot crop of sodium chlorid and again cooling to precipitate a second crop of potassium chlorid and removing this while leaving the magnesium chlorid in solution and finally evaporating the mother liquor at a high temperature with precipitation and removal of carnallite until a melt of about 48 per cent. $MgCl_2$ and 52 per cent. $H_2O$ is produced.

4. The process of treating brines containing chlorids of sodium, potassium and magnesium which consists in evaporating the brine at a relatively low temperature until it is nearly saturated with respect to potassium chlorid and freeing the concentrated solution from the precipitated sodium chlorid, evaporating this liquor at a high temperature, with removal of the precipitated sodium chlorid, until it is saturated with potassium chlorid but not with magnesium chlorid at that temperature, cooling to precipitate potassium chlorid and removing the precipitate, again saturating the solution by evaporation at a high temperature with potassium chlorid only and removing the hot crop of sodium chlorid and again cooling to precipitate a second crop of potassium chlorid and removing this while leaving the magnesium chlorid in solution, evaporating the final mother liquor at a high temperature, with precipitation and removal of carnallite until a melt of about 48 per cent. $MgCl_2$ and 52 per cent. $H_2O$ is produced and recovering the solid potassium chlorid from the carnallite by dissolving away the magnesium chlorid in it in a liquor saturated with potassium chlorid but not with magnesium chlorid.

5. The process of recovering potassium chlorid from brines containing sodium chlorid, potassium chlorid and magnesium chlorid which consists in alternately evaporating the solution at a high temperature to saturation with respect to potassium chlorid but not with respect to magnesium chlorid at that temperature and cooling to precipitate potassium chlorid, the precipitated sodium chlorid being removed from the hot solution, whereby the bulk of the potassium chlorid is recovered, while the magnesium chlorid is still in solution and precipitating the remainder of the potassium chlorid in the form of carnallite while further evaporating the solution at a high temperature to concentrate in magnesium chlorid.

6. The process of recovering potassium chlorid from brines containing sodium chlorid, potassium chlorid and magnesium chlorid which consists in alternately evaporating the solution at a high temperature to saturation with respect to potassium chlorid but not with respect to magnesium chlorid at that temperature and cooling to precipitate potassium chlorid, the precipitated sodium chlorid being removed from the hot solution, whereby the bulk of the potassium chlorid is recovered, while the magnesium chlorid is still in solution, precipitating the remainder of the potassium chlorid in the form of carnallite while further evaporating the solution at a high temperature to concentrate in magnesium chlorid and recovering the potassium chlorid from the carnallite by dissolving out its magnesium chlorid in a liquor saturated with potassium chlorid but not with magnesium chlorid.

7. The process of recovering potassium chlorid from brines containing sodium chlorid, potassium chlorid and magnesium chlorid which consists in alternately evaporating the solution at a high temperature to saturation with respect to potassium chlorid but not with respect to magnesium chlorid at that temperature and cooling to precipitate potassium chlorid, the precipitated sodium chlorid being removed from the hot solution, whereby the bulk of the potassium chlorid is recovered, while the magnesium chlorid is still in solution, precipitating the remainder of the potassium chlorid in the form of carnallite while further evaporating the solution at a high temperature to concentrate in magnesium chlorid and recovering the potassium chlorid from the carnallite by dissolving the carnallite in a hot solution unsaturated with both potassium and magnesium chlorid at the temperature employed and finally cooling to precipitate potassium chlorid.

In testimony whereof we have affixed our signatures, this 13th day of September 1916.
LOUIS C. JONES.
FRED L. GROVER.
JOSEPH L. SILSBEE.